June 13, 1950 I. A. KRAUSE 2,510,983

RADIO RECEIVER

Filed Feb. 23, 1945 3 Sheets-Sheet 1

INVENTOR.
IRVING A. KRAUSE
BY Percy P. Lantzy
ATTORNEY

June 13, 1950 I. A. KRAUSE 2,510,983

RADIO RECEIVER

Filed Feb. 23, 1945 3 Sheets-Sheet 2

INVENTOR.
IRVING A. KRAUSE
BY Percy P. Lantzy
ATTORNEY

June 13, 1950 I. A. KRAUSE 2,510,983

RADIO RECEIVER

Filed Feb. 23, 1945 3 Sheets-Sheet 3

INVENTOR.
IRVING A. KRAUSE

BY Percy P. Lantzy

ATTORNEY

Patented June 13, 1950 2,510,983

UNITED STATES PATENT OFFICE 2,510,983

RADIO RECEIVER

Irving A. Krause, Jersey City, N. J., assignor to Federal Telephone and Radio Corporation, New York, N. Y., a corporation of Delaware Application February 23, 1945, Serial No. 579,353

3 Claims. (Cl. 250—27)

This invention relates to radio reception of signal pulses and more particularly to the reception of T. M. (time modulated) signal pulses of the "push-pull" type.

By "push-pull" T. M., I have reference to that type of pulse time modulation where alternate pulses are displaced in time toward and away from each other according to substantially the instantaneous values of a signal wave. The pulses in the absence of modulation may be symmetrically or unsymmetrically spaced, that is to say, the pulses are equally spaced for symmetrical operation and for unsymmetrical operation, they are given an initial offset spaced relation. For demodulation of the time modulated pulses, the time displacements thereof are translated into amplitude displacements for application to audio utilization apparatus.

It is an object of my invention to provide a novel method and means for demodulating and translating time modulated pulses of the "push-pull" type into amplitude modulation energy.

Another object of my invention is to provide a method and means for utilizing the energy of each signal pulse to demodulate the time displacement of a following pulse.

Still another object of my invention is to provide a method and means to cause energy of each pulse to coincide with energy of a following pulse to effect translation of the combined time displacement of the pulses into amplitude displaced energy.

According to one feature of the invention, a demodulating pulse is produced in response to each signal pulse wherein the demodulating pulse includes a voltage variation characteristic, and has the time displacement of the initiating signal pulse, but which is retarded in time so as to coincide with a following signal pulse. The demodulating pulse thus produced is combined with the following signal pulse thereby producing a composite pulse, the peak of which represents the signal component of the two pulses.

The production of the demodulating pulse may follow any one of several different methods. In one method the energy of the signal pulses is delayed the desired amount and then re-shaped to provide the desired voltage variation characteristic. In still another method, the energy of the signal pulses is employed to produce sawtooth undulations which are in turn applied to a multi-vibrator or other triggerable circuit biased preferably for trigger operation at a level depending upon the amount of delay desired. Each signal pulse initiates a sawtooth undulation and the trigger circuit responds to the sawtooth potential when it reaches the voltage level at which the circuit is biased. The shaping operation may then be controlled by the characteristics of the trigger circuit, such as by first producing a substantially square wave which is suitably shaped by a condenser-resistor network or other pulse shaping circuit.

Still another feature of the invention includes, besides the delay and shaping of signal energy in one circuit, a similar shaping of the signal pulses in a second circuit without imposing any particular delay and then combining the two shaped pulses. The pulse shape in this form is preferably substantially triangular, whereby the two pulses when combined create a composite pulse of an amplitude corresponding to the degree of time displacement of the two pulses. Regardless of the type of delay, re-shaping and combining operation, the signal component present in the resulting composite pulse energy may be obtained by either a threshold clipping amplifier or by a peak riding clipper.

For a better understanding of the objects and features of the invention, reference may be had to the following detailed description in connection with the accompanying drawings in which.

Figures 1, 2, 3:
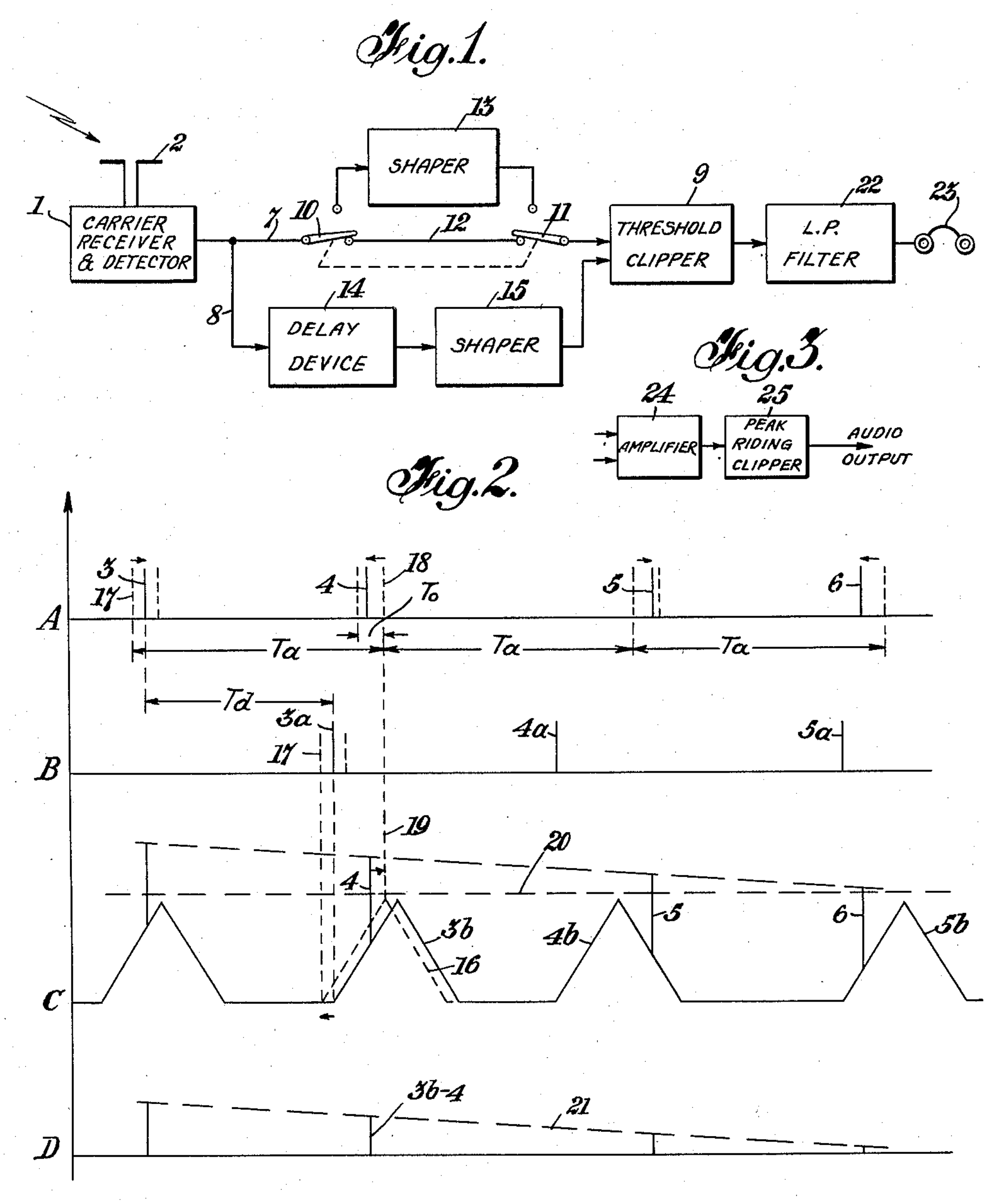
Fig. 1 is a block diagram of a radio receiver according to my invention.
Figs. 2 and 4 are graphical illustrations useful in explaining methods of operation of the receiver of Fig. 1.
Fig. 3 is a block diagram of a variation of the receiver of Fig. 1.

Referring to Figs. 1 and 2, I have shown the receiver of Fig. 1 to include a carrier receiver and detector 1 which may be of any known character for receiving pulse modulated carrier frequencies over antenna 2 and for removing the carrier component. A detected train of pulses 3, 4, 5, 6 etc. such as illustrated in graph A in Fig. 2 is applied over circuits 7 and 8 to threshold clipper 9. The circuit 7 includes a switch arrangement 10, 11 whereby the pulse energy may be applied directly to the threshold clipper over connection 12 or through a shaper 13, the purpose of which will be hereinafter described. The circuit 8 applies the pulse energy to a delay device 14 and a shaper 15 before application to the threshold clipper 9.

It will be noted in Fig. 2 that the pulses of graph A are shown to have an initial offset relation, the average timing characteristic $T_a$ is measured between one of the extreme limits of modulation. $T_o$ represents the maximum limits of time modulation of the pulses relative to their midposition such as represented by the position of pulse 3. Pulses 4, 5 and 6 are shown to be displaced in time from the mid-position of pulse 3, in push-pull according to a progressively decreasing negative swing of signal potential (see curve 21 of graph D, Fig. 2).

Assuming that the switch arrangement 10, 11 is in the position shown, the pulse energy applied to clipper 9 will be substantially as shown in graph A. The pulse energy applied to clipper 9 through circuit 8, however, is first delayed as indicated by graph B, the delayed pulses being identified as 3*a*, 4*a*, 5*a* etc.

The shaper 15 may be of any known character capable of re-shaping the delayed pulse energy to produce a pulse having oppositely disposed voltage variation such as indicated by the triangular pulse shape 3*b*, curve C. It will be understood, of course, that the time delay $T_d$ will depend upon the character of the delay device 14 and possibly also of the shaper 15. When the triangular pulses 3*b*, 4*b*, 5*b* etc. are combined with the corresponding signal pulses 4, 5, 6 etc., the latter are superimposed thereon as indicated in graph C. It will be observed that the alternate pulses are superimposed on opposite sides of alternate triangular pulses. For example, pulse 4 is superimposed on the left hand side of triangular pulse 3*b* and pulse 5 is superimposed on the right hand side of triangular pulse 4*b*. Since the time modulation is of push-pull character, the pulses 4 and 5, when displaced away from each other descend on the inclined portions of the corresponding pulses 3*b* and 4*b*. When the alternate pulses are displaced toward each other, they ascend on the corresponding alternate triangular pulses.

The push-pull displacement of the signal pulses, however, is also retained by the triangular pulses. By way of example, the triangular pulse 3*b* is shown in broken line in a position 16 which it would assume should the delayed pulse 3*a* occur in the extreme position indicated at 17, graphs A and B. Should this displacement take place for pulse 3, a similar displacement would take place for pulse 4 thereby placing it on or near the limit position indicated at 18 depending, of course, upon the modulating signal and the frequency of recurrence of the signal pulses. The combining action of pulse 4 and pulse 3*b* for these two extreme positions would then result in a pulse peak 19 which would represent the maximum amplitude displacement corresponding to a maximum time displacement. Thus, the displacements of pulses 3 and 4 combine in effect to produce the resulting amplitude displacement energy. This is of particular advantage since small displacements of pulses are thereby doubled according to my invention. A small difference of displacement for adjacent pulses will ordinarily occur due to a change in the modulating signal wave between the points represented by the time position of the pulses. This difference, however, is averaged by the combining of alternate pulses so that the output, in effect, produces an amplitude indication corresponding to a midpoint in the signal wave between signal pulses.

The threshold clipper 9 is provided with a bias so that it clips at a voltage level 20, thereby eliminating the triangular pulse energy and any interference energy occurring between signal pulses except for interference that may be of relatively large amplitude and coincide with the peak portions of the triangular pulses. Graph D shows the clipped energy as indicated at 3*b*—4, for example, whereby the signal envelope at 21 may be obtained by applying the output of clipper 9 to a low pass filter 22 for application to earphones 23 or to the utilization apparatus.

If desired, the threshold clipper 9 and filter 22 of Fig. 1 may be replaced by an amplifier 24 and a peak riding clipper 25 shown in Fig. 3. The amplifier in this instance would not be biased for clipping operation but would pass the energy received from circuits 7 and 8 substantially as illustrated in graph C of Fig. 2. The peak riding clipper 25 would then be controlled by the peaks of the composite pulses such as represented by the superimposed pulses 4, 5 and 6 whereby the signal envelope defined by the pulse peaks is obtained.

Figure 4:
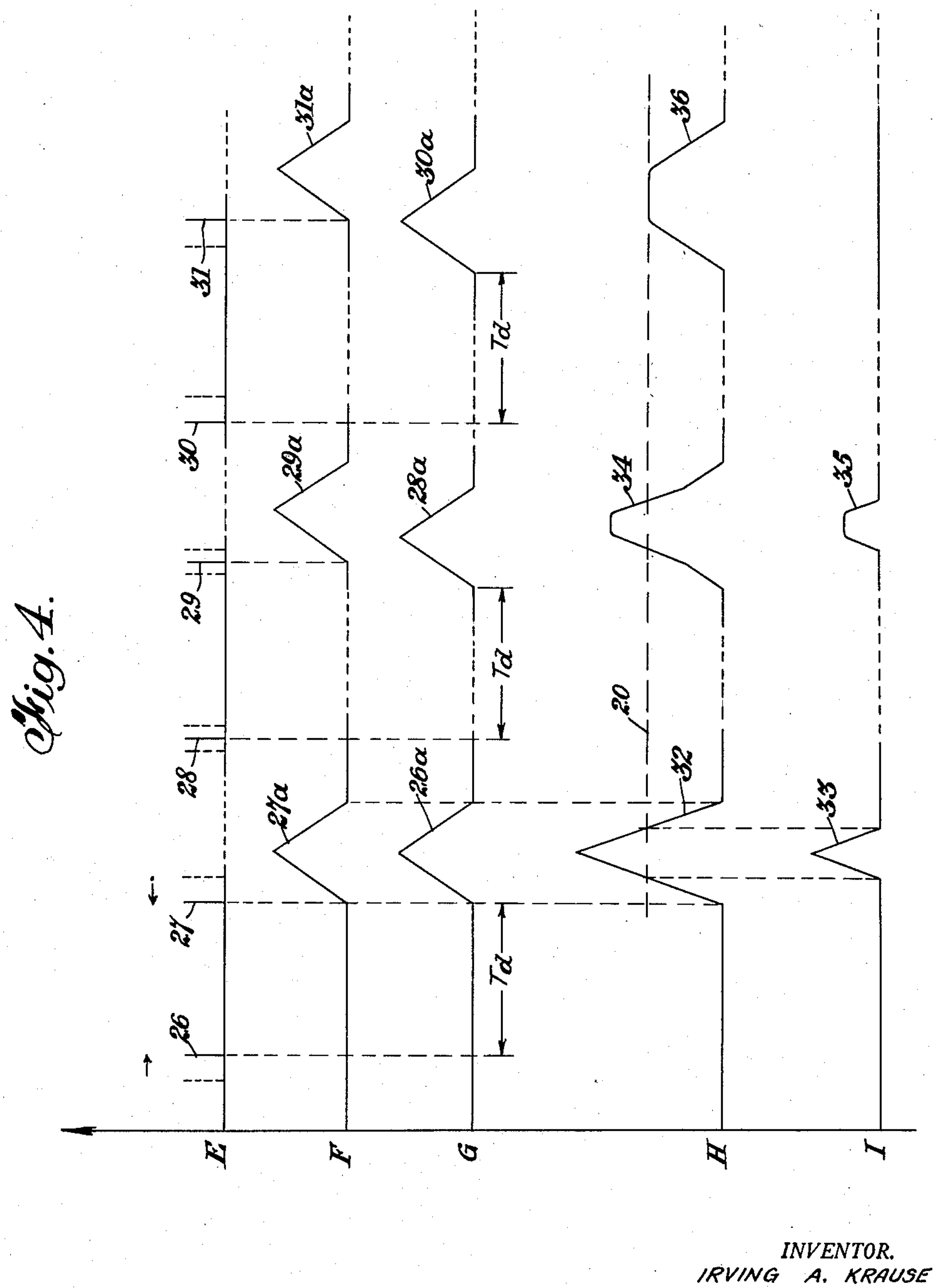

Referring to Fig. 4, I have shown in graph E three pairs of signal pulses 26, 27; 28, 29; and 30, 31 to illustrate the operation of the receiver of Fig. 1 when the switch arrangement 10, 11 is changed to pass pulse energy through the shaper 13. It will be understood, of course, that in a train of pulses including the pairs of pulses shown in graph E, that a large number of pulses will occur in the intervals between pairs, the three pairs being selected and shown in three representative time modulated positions for illustration of the invention. For example, pulses 26 and 27 are shown displaced to extreme positions toward each other to represent maximum positive signal energy, pulses 28 and 29 are shown in the positions assumed in the absence of modulation and pulses 30 and 31 are shown in the extreme positions spaced from each other representing maximum negative signal energy.

Referring particularly to the portions of graphs F, G, H, and I, below the pulses 26 and 27 of graph E, pulse 27 is shown after re-shaping as a triangular pulse 27*a*. Pulse 26 is shown to be similarly re-shaped at 26*a* and delayed an interval $T_d$. Since the two pulses 26 and 27 are in a position representing the extreme degree of modulation for a positive signal, the re-shaped pulses 26*a* and 27*a* thereof coincide to produce a maximum pulse 32 which, when subjected to threshold clipping at level 20 by clipper 9 results in pulse 33.

Pulses 28*a* and 29*a*, which correspond to input pulses 28 and 29 are displaced with respect to each other so that the degree of overlap produces a composite pulse 34 which is of less amplitude than pulse 32. The threshold clipping operation with respect to pulse 34 provides an output pulse 35.

Triangular pulses 30*a* and 31*a* corresponding to the pulses 30 and 31 overlap to produce a composite pulse 36 which just reaches the threshold clipping level 20 of tube 9. Since the time position of pulses 30 and 31 represents the maximum negative signal energy, zero output for this signal is to be expected, it being understood, of course, that clipping level may be chosen at a lower voltage if desired, in which case a given output will be obtained for the maximum negative signal.

It will be noted that the maximum pulse output 33 does not represent double the area of pulse 35. Thus, an integrating circuit for this pulse output may not be proportional linearly to the original signal. However, this system may be of use where the original signal is distorted to compensate for this effect. However, since the amplitude of the output signals corresponds substantially to the amplitude of the original signal, a peak riding clipper such as illustrated in Fig. 3 may be employed at the receiver in the place of threshold clipper 9.

Instead of triangular pulses, rectangular pulses may be employed in the demodulation method illustrated in Fig. 4. The rectangular pulses may comprise the output of the multi-vibrator 40 as indicated at 42, Fig. 5. In such case the degree of overlap will be directly represented in the composite pulse area which varies according to the time modulation of the signal pulses. The peak amplitude of the composite pulse portion will, however, remain constant.

Figure 5:
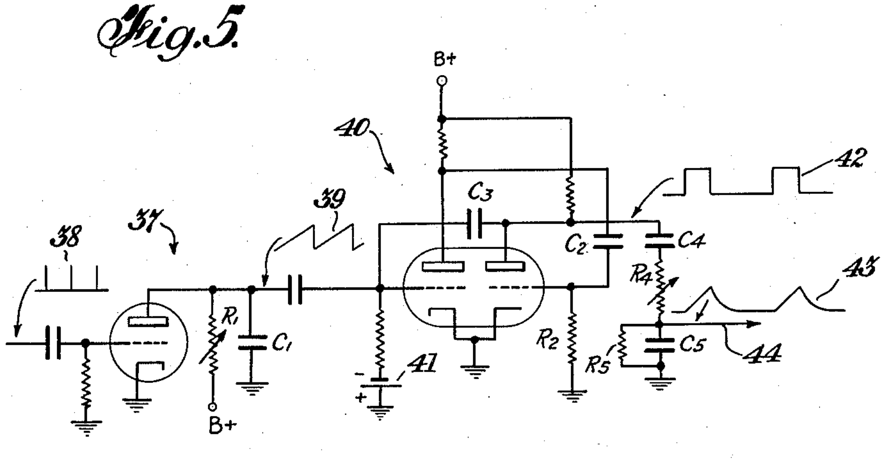
Fig. 5 is a circuit diagram of the delay and shaping units of the receiver of Fig. 1.
Figure 6:
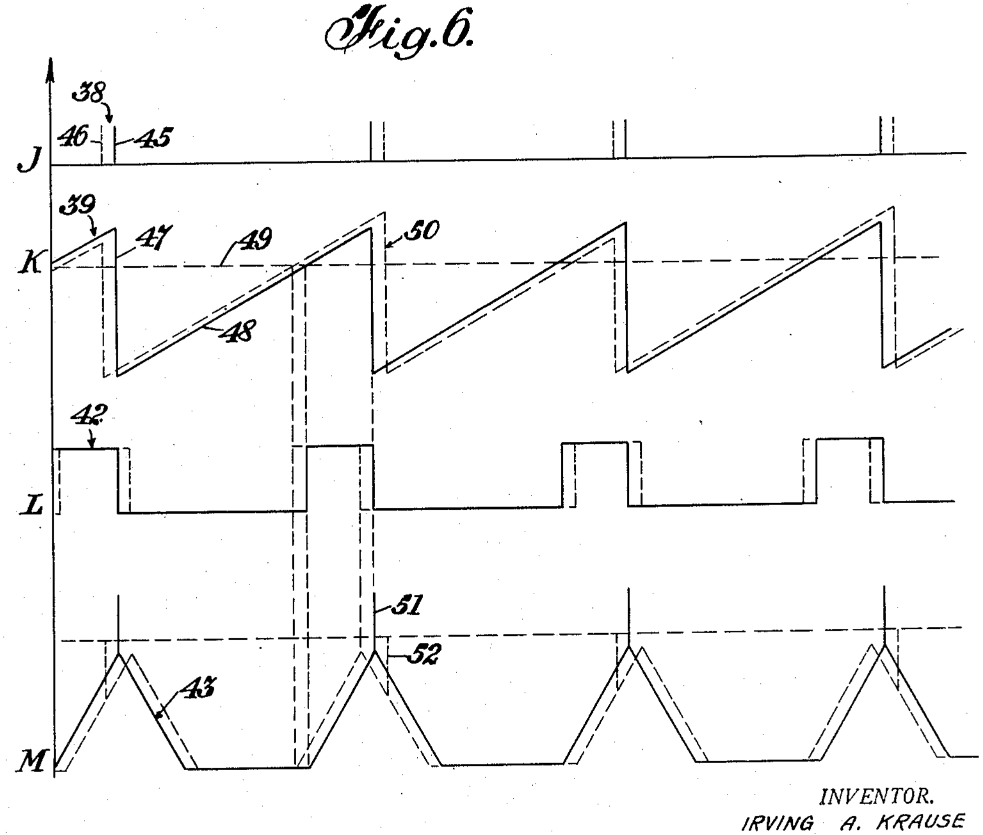
Fig. 6 is a graphical illustration useful in explaining the operation of the receiver when the circuit of Fig. 5 is included therein.

Referring to Figs. 5 and 6, I show a circuit to perform a clipping and circuit operation that may take place in units 14 and 15 in Fig. 1. The circuit includes a sawtooth generator 37 to which the signal pulses are applied as indicated at 38. The resistor $R_1$ and the condenser $C_1$ of the sawtooth generator control the slope of the output sawteeth 39, and may be adjusted as desired. The sawtooth wave 39 is applied to a threshold multi-vibrator 40. The multi-vibrator is of a known character provided with a bias at 41 to control the voltage level to which the multi-vibrator may be triggered from a first state of operation to a second state of operation. The values of resistor $R_2$ and capacitance $C_2$ control the duration of the second state of operation, thereby determining the instant that the multi-vibrator is returned from the second state of operation to the first state of operation. This operation results in a substantially rectangular wave shown at 42. The rectangular pulse portions of the wave 42 are further shaped by resistance $R_4$ and capacitance $C_5$. The capacitance $C_4$ acts as a blocking condenser and is of considerably larger value than capacitance $C_5$. The combination $R_4$, $C_5$ re-shapes the pulse portions of wave 42 substantially as indicated at 43, the resulting pulses being of a substantially triangular shape. The pulses 43 are applied over output connection 44 to the threshold clipper 9 or amplifier 24, Figs. 1 and 3, as the case may be.

The operation of the circuit of Fig. 5 may be summarized in connection with the graph of Fig. 6. The pulses 38 are shown in one extreme position of modulation as indicated at 45 while the opposite extreme position is indicated by a broken line at 46. When the pulse 45 is applied to the sawtooth generator 37, it discharges the condenser $C_1$ to produce a substantially vertical voltage drop 47, graph K. Upon removal of the pulse 45 from control of the generator, the potential on condenser $C_1$ commences to build up at the rate indicated at 48 under control of the values of $R_1$ and $C_1$. Each time a signal pulse is applied to the generator 37, a similar operation is produced thereby generating wave 39.

The rectangular shaped wave 42 produced by the multi-vibrator 40 is shown in graph L, the multi-vibrator being biased for triggering operation according to the voltage level 49, graph K. The triangular pulses 43 produced by the reshaping of rectangular pulses 42 is shown in graph M, it being understood that the rectangular pulse operates initially to charge the capacitance $C_5$ according to the time constants $R_4$, $C_5$. The triangular pulses then decay at a similar rate as controlled mainly by the values of $R_5$ and $C_5$. The build-up and decay rates may not be exactly symmetrical but by adjustment of $R_4$ and $R_5$, this desired symmetrical relationship may be closely approximated.

The broken line sawtooth wave 50 of graph K represents the timing of the sawtooth in relation to sawtooth wave 39 when the pulses are modulated to the extreme positions represented by the broken line 46, graph J. This variation of sawtooth timing varies proportionately the timing of the rectangular pulses 42 and likewise the timing of the triangular pulses 43. Thus, the triangular pulses retain the time displacement of the signal pulses from which they are initiated so that the displacement thereof operates in conjunction with the time displacement of the signal pulse superimposed thereon to substantially double the time displacement effect for translation purposes.

It will be noted that the two positions represented by the superimposed pulse indications 51 and 52, graph M represent the extreme positions of the superimposed pulses relative to the triangular pulses and that they occur on the upper regions of the triangular pulses. Since any distortion in the symmetrical relationship of the leading and trailing edges of the triangular pulses is likely to occur in the lowers regions of the trailing edge, such deviation from the symmetrical will not enter into the translation of the signal time displacements.

The shaper 13 may comprise a multi-vibrator similar to the one shown at 40, Fig. 5, together with shaper network $R_4$, $C_5$. The signal pulses, in such case, are applied to the multi-vibrator in the place of sawtooth wave 39.

While I have shown and described the principles of my invention in connection with specific apparatus, it will be understood that such apparatus has been shown for purposes of illustration only and not as a limitation of the scope of the invention as set forth in the objects and appended claim.

I claim:

1. In a receiver for time modulated signal pulses, means for producing a sawtooth wave, the teeth of which are timed in accordance with the occurrence of the signal pulses, generator means responsive to an application of energy at a given voltage level to produce a substantially square pulse of a given width, means to apply said sawtooth voltage to said generator means to effect production of a square pulse a given time delay after the occurrence of the initiating signal pulse, means to shape each square pulse into a triangularly shaped demodulating pulse whose time position overlaps with a following signal pulse, and means to combine the demodulation pulses with the signal pulses to form composite pulses having peaks representing the signal components of the signal pulses.

2. In a receiver for time modulated signal pulses, means for producing a sawtooth wave, the teeth of which are timed in accordance with the occurrence of the signal pulses, a multi-vibrator, means to apply said sawtooth voltage to said multi-vibrator, means to bias said multi-vibrator to respond to said sawtooth wave for change from one state of operation to a second state of operation when the sawtooth potential reaches a given voltage level, the multi-vibrator being arranged to return to its first state of operation after a predetermined period, whereby a substantially square pulse output is obtained, each square pulse having a given time delay relationship with respect to the initiating signal pulse, means to shape each square pulse into a triangularly shaped demodulating pulse whose time position overlaps with a following signal pulse, and means to combine the demodulation pulses with the signal pulses to form composite pulses having peaks representing the signal components of the signal pulses.

3. In a receiver for time modulated signal pulses, means for producing a sawtoth wave, the teeth of which are timed in accordance with the occurrence of the signal pulses, a multi-vibrator, means to apply said sawtooth voltage to said multi-vibrator, means to bias said multi-vibrator to respond to said sawtooth wave for change from one state of operation to a second state of operation when the sawtooth potential reaches a given voltage level, the multi-vibrator being arranged to return to its first state of operation after a predetermined period whereby a substantially square pulse output is obtained, each square pulse having a given time delay relationship with respect to the initiating signal pulse, means to shape each square pulse into a triangularly shaped demodulating pulse whose time position overlaps with a following signal pulse, means to combine the demodulation pulses with the signal pulses, to form composite pulse energy and means to obtain the signal components represented by the peaks of said composite pulse energy.

IRVING A. KRAUSE.

REFERENCES CITED

The following references are of record in the file of this patent:

UNITED STATES PATENTS

| Number | Name | Date |
|---|---|---|
| 2,166,688 | Kell | July 18, 1939 |
| 2,212,648 | Poch | Aug. 27, 1940 |
| 2,235,131 | Wheeler | Mar. 18, 1941 |
| 2,250,708 | Herz | July 29, 1941 |
| 2,255,403 | Wheeler | Sept. 9, 1941 |
| 2,266,401 | Reeves | Dec. 16, 1941 |
| 2,270,773 | Sonnentag | Jan. 20, 1942 |
| 2,391,776 | Fredendall | Dec. 25, 1945 |
| 2,412,974 | Deloraine | Dec. 24, 1946 |
| 2,413,023 | Young | Dec. 24, 1946 |
| 2,416,306 | Greig | Feb. 25, 1947 |